US010024426B2

(12) United States Patent
Ratzke et al.

(10) Patent No.: US 10,024,426 B2
(45) Date of Patent: Jul. 17, 2018

(54) TRANSMISSION ARRANGEMENT (71) Applicant: CLAAS INDUSTRIETECHNIK GMBH, Paderborn (DE)

(72) Inventors: Michael Ratzke, Guetersloh (DE); Torsten Eisold, Paderborn (DE); Jan-Willem Verhorst, Lippstadt (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 404 days.

(21) Appl. No.: 14/745,741

(22) Filed: Jun. 22, 2015

(65) Prior Publication Data
US 2015/0377350 A1 Dec. 31, 2015

(30) Foreign Application Priority Data

Jun. 27, 2014 (DE) .................. 10 2014 109 066

(51) Int. Cl.
F16H 61/4183 (2010.01)
F16H 47/04 (2006.01)
F16H 61/42 (2010.01)
F16H 39/04 (2006.01)
F16H 57/00 (2012.01)
F16H 39/02 (2006.01)
F16L 55/04 (2006.01)

(52) U.S. Cl.
CPC ......... *F16H 61/4183* (2013.01); *F16H 39/02* (2013.01); *F16H 39/04* (2013.01); *F16H 47/04* (2013.01); *F16H 57/0006* (2013.01); *F16H 61/42* (2013.01); *F16H 2057/0012* (2013.01); *F16L 55/041* (2013.01)

(58) Field of Classification Search
CPC ...... F16H 47/04; F16H 57/0006; F16H 61/42; F16H 61/4183; F16H 39/02; F16H 39/04
USPC .................................................. 60/327, 469
See application file for complete search history.

(56) References Cited

U.S. PATENT DOCUMENTS

| 3,348,579 | A | * | 10/1967 | Swift | F16L 55/05 137/207 |
| 3,449,912 | A | * | 6/1969 | Habdank-Dunikowski | F16H 61/4008 137/494 |
| 3,775,981 | A | * | 12/1973 | Molly | F01B 3/0035 60/484 |
| 3,864,916 | A | * | 2/1975 | Maistrelli | B60K 17/10 60/485 |
| 3,884,095 | A | * | 5/1975 | Miyao | F16H 47/04 138/30 |
| 4,111,003 | A |   | 9/1978 | Bolinger et al. | |
| 5,379,594 | A | * | 1/1995 | Quellhorst | B66F 9/07545 181/214 |

(Continued)

FOREIGN PATENT DOCUMENTS

DE 2815632 11/1978
EP 2503190 9/2012

*Primary Examiner* — Michael Leslie
*Assistant Examiner* — Richard Drake
(74) *Attorney, Agent, or Firm* — Collard & Roe, P.C.

(57) ABSTRACT

A transmission arrangement includes a hydrostatic transmission in which a hydrostatic unit functioning as a pump is hydraulically connected to a hydrostatic unit functioning as a motor in order to transfer drive power. The arrangement is configured with structure for damping hydraulic pressure fluctuations. The structure is assigned to a hydraulic line connecting at least one of the hydrostatic units.

15 Claims, 5 Drawing Sheets

(56) References Cited

U.S. PATENT DOCUMENTS

| | | | | |
|---|---|---|---|---|
| 5,403,241 | A * | 4/1995 | Jarchow | E02F 9/202 |
| | | | | 475/72 |
| 6,203,283 | B1 * | 3/2001 | Fleming | F01B 3/102 |
| | | | | 417/218 |
| 6,257,119 | B1 * | 7/2001 | Ryken | F04B 1/328 |
| | | | | 91/506 |
| 6,283,721 | B1 * | 9/2001 | Gollner | F03C 1/0694 |
| | | | | 417/222.1 |
| 6,672,058 | B1 * | 1/2004 | Langenfeld | B60K 17/105 |
| | | | | 180/6.3 |
| 7,014,429 | B2 * | 3/2006 | Gray, Jr. | F04B 1/124 |
| | | | | 417/269 |
| 7,305,915 | B2 * | 12/2007 | Gray, Jr. | F04B 1/2014 |
| | | | | 92/12.2 |
| 7,377,105 | B1 * | 5/2008 | Raymond | F04B 1/22 |
| | | | | 60/484 |
| 7,987,669 | B2 * | 8/2011 | Irikura | B60K 17/105 |
| | | | | 417/375 |
| 8,096,228 | B1 * | 1/2012 | Wright | F16H 39/08 |
| | | | | 91/505 |
| 8,240,145 | B2 * | 8/2012 | Dyck | F16H 39/08 |
| | | | | 60/490 |
| 2013/0199362 | A1 * | 8/2013 | Hoover | F04B 1/20 |
| | | | | 91/499 |
| 2014/0245733 | A1 * | 9/2014 | White | F15B 15/20 |
| | | | | 60/469 |
| 2015/0047404 | A1 * | 2/2015 | De Luca | F15B 21/008 |
| | | | | 72/245 |
| 2016/0169357 | A1 * | 6/2016 | Vallerant | F16H 61/423 |
| | | | | 60/327 |

\* cited by examiner

TRANSMISSION ARRANGEMENT

CROSS-REFERENCE TO A RELATED APPLICATION

The invention described and claimed hereinbelow is also described in German Patent Application DE 10 2014 109 066.7, filed on Jun. 27, 2014. The German Patent Application, subject matter of which is incorporated herein by reference, provides the basis for a claim of priority of invention under 35 U.S.C. 119(a)-(d).

BACKGROUND OF THE INVENTION

The invention relates to an arrangement comprising at least one hydrostatic transmission, in which a hydrostatic unit functioning as a pump is hydraulically connected to a hydrostatic unit functioning as a motor in order to transfer drive power.

DE 28 15 632 discloses a hydrostatic transmission comprising two hydrostatic units, which are connected via a common connection plate to form an assembly. In order to reduce emitted operating noises caused by on-going compressions and decompressions of the hydraulic medium within the hydrostatic units (axial piston machines), it is proposed in DE 28 15 632 to mechanically decouple the assembly from an outer housing of the transmission by means of an elastic bearing.

In addition, reference is made to EP 2 503 190, which in order to reduce operating noises of a hydromechanical transmission arrangement, it is disclosed that the hydrostatic transmission part of the hydromechanical transmission arrangement is resiliently mounted relative to the transmission housing by damping elements.

Agricultural vehicles such as tractors, for example, increasingly comprise transmissions having a continuously variable transmission as part of the drive train. In terms of design, such transmissions having a continuously variable transmission (CVT) typically comprise, inter alia, a hydrostatic transmission having two hydrostatic units, which are hydraulically connected to one another. One of the units functions as a pump and the other unit functions as a motor. Given that at least one of the units has a variable hydraulic intake volume/pump capacity, the speed ratio between the shafts of the pump and the motor is steplessly adjusted.

The interaction of the hydrostatic transmission with a power-split mechanical transmission results, in combination, in a hydromechanical transmission arrangement, in which a transmission ratio between the input shaft and the output shaft is steplessly varied, at least within ranges. When the transmission ratio is changed, the split between the mechanically transmitted drive power and the hydraulically transmitted drive power also changes. Various designs of such transmission arrangements are known.

In practical application, it is shown that the above-described transmission arrangements, which comprise a hydrostatic transmission, very noticeably generate noise at least in certain operating situations, which is perceived at the least as being disturbing. Increased wear of affected components, which are caused to vibrate, may also occur in these operating situations. Depending on the design and dimensions of the transmission arrangement, it is not a sufficient solution to simply mechanically decouple the hydrostatic transmission in order to reduce operating noises at least in certain operating situations.

SUMMARY OF THE INVENTION

The present invention overcomes the shortcomings of known arts, such as those mentioned above.

In an embodiment, the invention provides a transmission arrangement that develops less noise. The transmission arrangement is characterized in that means for damping hydraulic pressure fluctuations is assigned to at least one hydraulic line connecting the hydrostatic units.

Applicants have found that hydrostatic units cause hydraulic pressure fluctuations during operation. In the case of axial piston machines that are typically used, these pressure fluctuations are caused by the transfer of the mechanical piston movements into the pressure fluid. The pressure fluctuations thereby form a pressure wave, the wavelength of which is dependent on the frequency with which the pistons induce the pressure fluctuation. There is a direct correlation between the rotational speed of the hydrostatic unit and the frequency or wavelength of the pressure fluctuation.

Proceeding from this mode of operation, it has been further discovered that, depending on the particular geometric dimensions of the transmission arrangement, it is possible that the half wavelength of a pressure fluctuation, or any multiple thereof, corresponds exactly to the (structural) length of a hydraulic line connecting the hydrostatic units. In such a case, a stationary pressure wave ("standing wave") forms in the hydraulic line, in which the transit time of a wave maximum exactly corresponds to the time within which the next wave maximum is generated by the oscillator, i.e., a hydrostatic unit. The effect of this phenomenon is that wave maxima continuously increase and a continuously increasing pressure amplitude forms in the hydraulic line. Within a hydraulic pump-motor circuit, which has a high-pressure side and a low-pressure side and is formed of two hydrostatic units, the result is that, on the high-pressure side, a continuously increasing pulse is transmitted from the hydraulic line to the supporting mechanical structure of the transmission arrangement, which induces disturbing operating noises. On the low-pressure side, however, there is a risk that the dynamic pressure within the hydraulic line will drop by a very great extent, wherein cavitation, i.e., the formation (and subsequent disappearance) of vapor-filled cavities (vapor bubbles) within the hydraulic fluid, can occur, which also generates disturbing noises.

With knowledge of the identified cause of the noise that is produced within the hydrostatic transmission, a simple and effective countermeasure has been found, according to the invention, by which excessively high pressure on the high-pressure side and/or pressure drops, and, therefore, cavitation on the low-pressure side is avoided or at least substantially reduced. According thereto, a means for damping hydraulic pressure fluctuations is assigned at least to one hydraulic line connecting the hydrostatic units. Such means may embody various hydraulically effective devices, by which hydraulic pressure fluctuations within a hydraulic line are damped.

According to an embodiment, the hydraulic line is connected to a hydraulically effective damping element, in particular, a Helmholtz resonator, a lambda/4 hose, or a hydraulic spring-operating storage. Such an element, which is coupled to the hydraulic line connecting the hydrostatic units, e.g., via a branch channel or tap-off line, is suitable for damping hydraulic pressure fluctuations propagating within the hydraulic line. One such hydraulically effective damping element is provided, or a plurality, e.g., two hydraulically effective damping elements, is coupled to a hydraulic line. The greatest efficacy of hydraulically effective damping elements results when a particular coupling is located as close to an end as possible.

A Helmholtz resonator is an acoustic resonator, which is substantially formed by a resilient volume, which, together with the branch channel coupled to the hydraulic line, forms an oscillatory acoustic system having a single certain resonant frequency, or several resonant frequencies. Given a suitable design and location of the Helmholtz resonator, the Helmholtz resonator effectively absorbs certain oscillation frequencies. As an alternative, a so-called lambda/4 hose can be used as the hydraulically effective damping element. In this case, a tubular element (e.g., hose) is connected to a hydraulic line connecting the hydrostatic units, the tubular element having a length corresponding to one-fourth of the wavelength to be damped. The tubular element is closed at the end facing away from the hydraulic line, in order to reflect pressure waves that impact there. Due to the reflection after one-fourth of the wavelength, the lambda/4 hose induces a phase shift of the returning wave by 180° relative to the wave in the hydraulic line, and therefore the wave cancels itself out.

As an alternative or in addition to the above-described hydraulically effective damping elements, it is conceivable to actively damp the hydraulic oscillations ("active damping element"). To this end, corrective pressure fluctuations (also known as "anti-sound") are fed into the hydraulic line, which ideally add up to zero with the hydraulic pressure fluctuations caused by operation. The corrective pressure fluctuations could be generated, for example, by a piezoactuator as the active damping element, which is coupled to the hydraulic line via a small volume. An active damping that is achieved in this manner, or in a comparable manner, offers the advantage that hydraulic pressure fluctuations are damped with a different and/or variable frequency without changing the structural elements of the hydraulic system.

Independently of the type of hydraulically effective damping element that is selected, particularly effective damping is achieved when this damping takes place in the vicinity of an antinodal point of the stationary wave to be damped. On a transmission arrangement having a hydrostatic transmission of the type described, an antinodal point (wave maximum) is usually located in the direct vicinity of a hydrostatic unit, and therefore a hydraulically effective damping element is preferably and effectively disposed there.

The hydrostatic units used in the context of the invention can basically have any design. Preferably, at least one, preferably both of the hydrostatic units, is an axial piston machine having a variable intake volume/pump capacity. Given that one, preferably both hydrostatic units have a variable intake volume/pump capacity, a steplessly adjustable transmission ratio between a hydrostatic unit functioning as a pump and a hydrostatic unit functioning as a motor is achieved given an appropriate hydraulic connection of the hydrostatic units by changing the volume of one or both axial piston machines. Various designs of adjustable axial piston machines are known and can be used within the scope of the invention.

For example, at least one hydrostatic unit has a swash plate design and comprises a swash plate, which can pivot about an axis relative to the housing thereof in order to vary the pump capacity and/or intake volume of the hydrostatic unit. In a hydrostatic unit having a swash plate design, a piston barrel, i.e., a rotatable piston housing provided with cylinder bores, rotates relative to a control bottom secured to the housing. The pump capacity/intake volume is varied by an angular deflection of the swash plate (also referred to as a "swivel disk") installed above the housing. The pistons are axially connected to the swash plate in a non-positive or form-fit manner and therefore execute one full stroke with each revolution. In the swash plate design, the hydraulically effective damping element is advantageously integrated into the housing of the hydrostatic unit or can be mounted thereon. Since, in this design, the housing is fixed and is often solid, hydraulically effective damping elements can be cast therein relatively easily.

In an embodiment of the transmission arrangement, at least one of the hydrostatic units is designed as an axial piston machine having a swash plate design, comprising a pivot housing, which can pivot about an axis in order to vary the pump capacity and/or intake volume of the hydrostatic unit. An axial piston machine having a swash plate design expediently comprises, from a structural perspective, a rotatable piston housing provided with cylinder bores in each case and having pistons inserted therein, which are connected to a drive flange disk via ball joints. An axis of rotation of the piston housing forms, in each case, a pivot angle with an axis of rotation of the drive flange plate. The pivot angle is changed by pivoting a pivot housing (which accommodates the piston housing) about a pivot axis, in order to change the pump capacity and/or intake volume of the hydrostatic unit.

When axial piston machines having a swash plate design are used, the hydraulic line extends, in sections, through the pivot housing of a hydrostatic unit and the hydraulically effective damping element is connected to the hydraulic line within the pivot housing. By connecting the damping element and the hydraulic line within the pivot housing, it is ensured that the damping takes place in the direct vicinity of a hydrostatic unit and, therefore, is particularly effective. In addition, this measure makes it possible to ensure the hydraulic seal integrity of the coupling of the hydraulically effective element using a simple design.

The invention provides that the hydraulically effective damping element is connected to the hydraulic line at or at least close to an end of the hydraulic line facing the hydrostatic unit. Such arrangement provides a particularly high efficacy of the damping results, since maxima of a stationary wave typically occur at the ends of the hydraulic line extending between the hydrostatic units, in particular, at the transition of a hydraulic line to the rotating axial piston machine.

In an embodiment, the transmission arrangement includes that the hydraulically effective damping element is an integral component of the pivot housing, in particular since the pivot housing having the integrated damping element is produced as a cast part. Such an embodiment offers not only an easily achieved hydraulic seal integrity of the entire damping arrangement, but also the advantage that the number of installed parts remains the same. No additional installation effort is required, and there is very little susceptibility to interference.

As previously mentioned, various operating principles can be used to damp oscillations. Preferably, in terms of design, a Helmholtz resonator is used. In this sense, the hydraulically effective damping element is advantageously formed by a hydraulic volume, which is connected to the hydraulic line and is enclosed by a hollow body, in particular, by a part of the pivot housing. As compared to any other spring-mass-oscillator (hydraulic spring-operating storage) or a lambda/4 hose, a Helmholtz resonator offers the advantage that the Helmholtz resonator can be installed in a relatively simple manner, namely, by integration into the pivot housing of a hydrostatic unit. The pivot housing remains movable in this case, largely without being adversely affected by the damping element.

The hydraulically effective damping element is preferably designed to damp oscillations, the half wavelength of which, or a multiple thereof, corresponds to the length of the hydraulic line between the two hydrostatic units. If this is a passive damping element, such as a Helmholtz resonator, for example, the damping characteristics are determined, in particular, by the resonant frequency thereof.

According to an embodiment, the Helmholtz resonator is designed such that the resonant frequency thereof can be adjusted, at least within certain limits. To this end, the volume of the Helmholtz resonator is designed to be variable by suitable means. Another possibility for influencing the damping characteristics is achieved, furthermore, by providing an aperture or, in general, a constriction in the region of the resonator neck. The bandwidth of the resonant effect, in particular, increases by use of an orifice plate. A larger spectrum of oscillations is therefore damped.

In an embodiment of the transmission arrangement, the hydrostatic transmission comprises two hydrostatic units, which are connected to one another via parallel hydraulic lines to form a hydraulic circuit having a high-pressure side and a low-pressure side. In this context, the hydrostatic units are designed as the same model such that the hydrostatic transmission is operated with a reversible direction of hydraulic flow. The assignment of the two hydrostatic units can be switched between pump and motor. Depending on the intended use, the hydrostatic units, which have the same design, can have a different overall size.

In an embodiment, a separate pivot housing is assigned to at least one of the hydrostatic units, preferably, however, to both hydrostatic units, thereby permitting the pump capacity and/or intake volume thereof to be adjusted individually.

In an embodiment of the transmission arrangement, the hydrostatic units are assigned to a common pivot housing (a so-called "double yoke arrangement"), thereby permitting a pump capacity and/or intake volume of the hydrostatic units to be adjusted jointly.

In a transmission arrangement comprising individually adjustable hydrostatic units, the hydrostatic transmission preferably has a bearing bridge, which accommodates the hydrostatic units in an axially parallel orientation and with distance therebetween. Such an embodiment offers various advantages, in particular for use within a higher-order transmission arrangement. The result is a fixedly defined spacing between the hydrostatic units and a compact design. In addition, the hydraulic lines connecting the hydrostatic units, in particular, the hydraulic lines of the high-pressure side and the low-pressure side, can be designed as a line cast into the bearing bridge of the hydrostatic transmission, at least in regions. Such a line design proves to be particularly insusceptible to interference.

Transmission arrangements that comprise a hydrostatic transmission of the type described above can basically be used in different applications. In an embodiment, the transmission arrangement comprises not only the hydrostatic transmission but also a power-split mechanical transmission, which interacts with the hydrostatic transmission in order to form, in combination, a hydromechanical transmission arrangement. Such a hydromechanical transmission arrangement can be used, e.g., on an agricultural vehicle, in particular, on a tractor, as part of the drive train thereof, in order to provide a transmission having a continuously variable transmission ratio.

In an exemplary hydromechanical transmission arrangement, each of the hydrostatic units is drivably connected to a shaft of the power-split mechanical transmission via a coupling element, in particular, via a curved teeth coupling. The hydrostatic transmission comprising the two hydrostatic units, which function as pump and motor, can therefore be driven via the power-split mechanical transmission and, in addition, drives a branch of the power-split mechanical transmission in a predefinable speed ratio (=transmission ratio).

According to an embodiment, the hydromechanical transmission arrangement can be brought from a first gear ratio range into a second gear ratio range, wherein the power flow of the hydrostatic transmission reverses in the event of a switch between the gear ratio ranges.

BRIEF DESCRIPTION OF THE DRAWINGS

Further features and advantages of the invention will become apparent from the description of embodiments that follows, with reference to the attached figures, wherein:

FIG. 4b depicts a perspective view, from the front, of the pivot housing shown in FIG. 4a.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
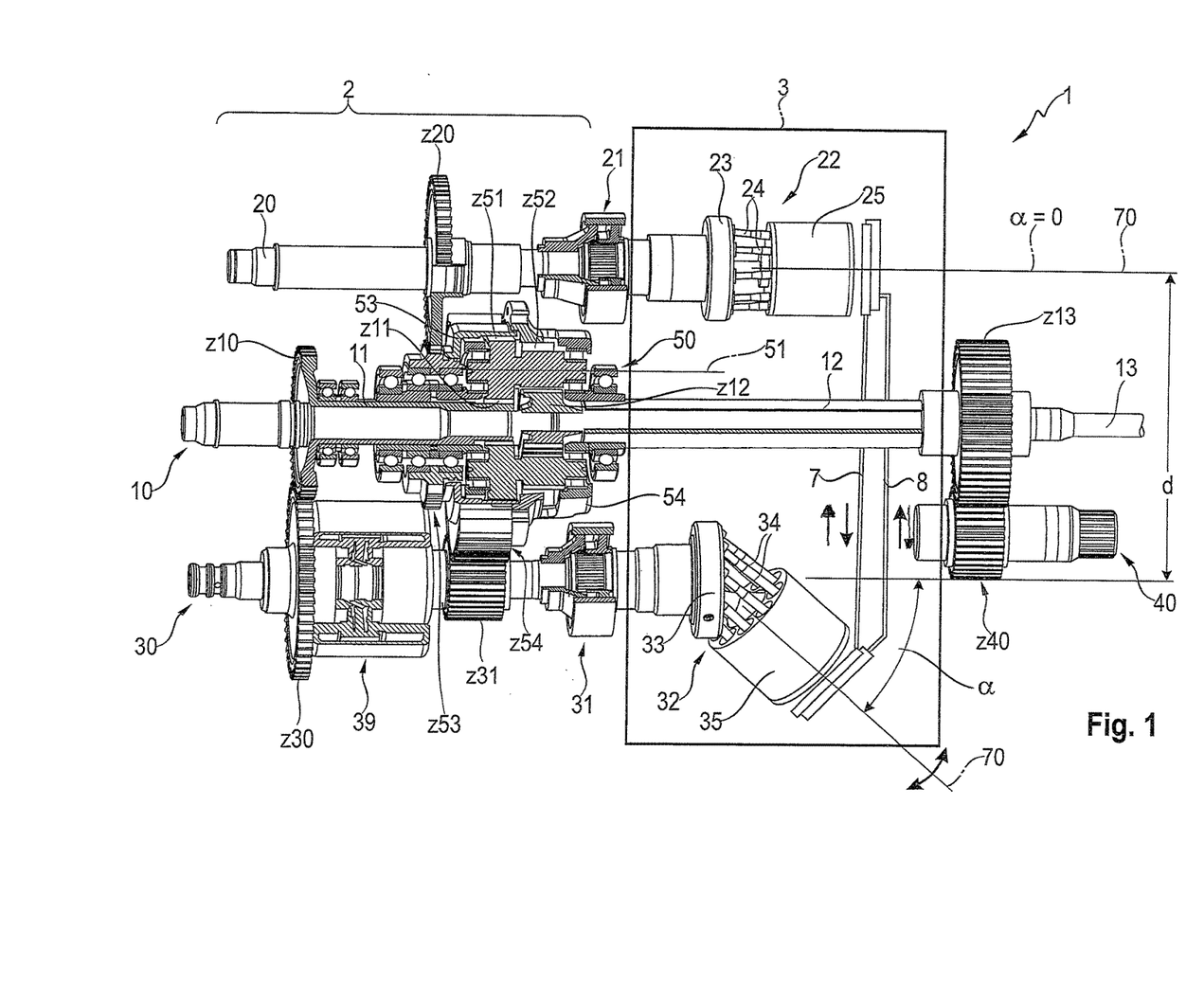
FIG. 1 depicts a schematic illustration of a hydromechanical transmission arrangement.

FIG. 1 is a schematic illustration of a transmission arrangement 1, on which the invention described herein can be used. The transmission arrangement 1 comprises a power-split mechanical transmission 2 and a hydrostatic transmission 3 combined therewith. In all, the two transmissions 2 and 3, which interact with one another, form a hydromechanical transmission arrangement 1. Such a hydromechanical transmission arrangement 1 is preferably used as part of a drive train of a vehicle, in particular an agricultural vehicle such as a tractor and, therein, makes possible a continuously variable transmission ratio between an input shaft 10 (which can be driven by a non-illustrated drive engine) and an output shaft 40 (which supplies a driving axle of the vehicle with drive power) of the transmission arrangement 1. The design of the transmission arrangement 1 is described in detail in the following: An input shaft 10 having a drive connection to a drive engine (not shown) enters the transmission arrangement 1 in the center. The input shaft 10 lies on an axis with a power take-off shaft 13 emerging from the transmission arrangement 1. The input shaft 10 and the power take-off shaft 13 are connected to one another in a rotationally fixed manner. The speed of the power take-off shaft 13 therefore always corresponds to the speed of the input shaft 10.

The input shaft 10 is part of the mechanically power-split transmission 2. In addition to the input shaft 10, the transmission comprises two intermediate shafts 20, 30, each of which extends parallel to the input shaft 10 at the same distance therefrom and which are spaced apart from one another by a distance d. Each of the intermediate shafts 20 and 30 is drivably connected to the hydrostatic transmission 3 of the transmission arrangement 1 via a curved teeth coupling 21 and 31, respectively.

The mechanically power-split transmission 2 is designed as a stepped planetary transmission. Thus, an assembled planetary gear 50 forms the functional core of the mechanically power-split transmission 2. The assembled planetary gear 50 is arranged coaxial with the input shaft 10 and substantially comprises a rotatably mounted gear carrier 54, a ring gear 53, which is mounted so as to rotate independently of the gear carrier 54, and a plurality of planet gears $z51$, $z52$, which are supported relative to the gear carrier 54 via planet axes 51.

The gear carrier 54 is connected in a rotationally fixed manner to a hollow shaft 12, the axis of rotation of which coincides with the axes of rotation of the input shaft 10 and the power take-off shaft 13. A gear $z13$ is mounted on the hollow shaft 12, which meshes with a gear $z40$ mounted on the output shaft. In this manner, the gear carrier 54 is constantly drivably connected to the output shaft 40 of the transmission arrangement 1 via the hollow shaft 12 and the gears $z13$ and $z40$. In addition, an outer gear rim $z54$ (external toothing) is formed on the gear carrier 54, which meshes with a gear $z31$ mounted on the intermediate shaft 30.

The gear carrier 54 accommodates a plurality of planet gears. These are planet gears of a first stage $z51$ and planet gears of a second stage $z52$. A planet gear of the first stage $z51$ is mounted, together with a planet gear of the second stage $z52$ in each case, so as to be jointly rotatable about a planet axes 51 relative to the gear carrier 54. The assembled planetary gear 50 comprises, for example, three pairings of planet gears of the first and the second stage $z51$, $z52$, respectively. The planet axes 51 extend at the same distance from and parallel to the central axes 10, 12, 13 and are evenly arranged around the axes. The planet gears of the first stage $z51$ have a larger diameter than the planet gears of the second stage $z52$.

The planet gears of the first stage $z51$ mesh internally with a first sun gear $z11$. The first sun gear $z11$ is arranged on a hollow shaft 11, which is mounted so as to be capable of rotating about an axis that coincides with the input shaft 10. In addition, a gear $z10$ is mounted on the hollow shaft 11 in a rotationally fixed manner. The gear $z10$ meshes with a gear $z30$ mounted on the intermediate shaft 30.

The gears $z30$ and $z31$ mounted on the intermediate shaft 30 can be selectively connected in a rotationally fixed manner to the intermediate shaft 30 via a coupling 39. The mode of operation of the coupling 39 is exclusive, i.e., either the gear $z30$ or the gear $z31$ is drivably connected to the intermediate shaft 30.

The ring gear 53 of the assembled planetary gear 50 is mounted so as to be capable of rotating about the central axes 10, 11 and extends in the axial direction partially into the gear carrier 54. Due to the thusly formed nested configuration of the ring gear 53 and the gear carrier 54, the planet gears of the first stage $z51$ are in meshed engagement on the outer side with an internal toothing formed on the ring gear 53. In addition, a gear rim $z53$ (having external toothing) is connected to the ring gear 53 in a rotationally fixed manner. Via this gear rim $z53$, the ring gear 53 is in meshed engagement with a gear $z20$ mounted on the intermediate shaft 20 in a rotationally fixed manner.

The planet gears of the second stage $z52$ are in meshed engagement on the inner side with a second sun gear $z12$. The second sun gear $z12$ is mounted on the input shaft 10 in a rotationally fixed manner.

Essential aspects of components of the mechanically power-split transmission 2 have therefore been described. In order to facilitate understanding of the mode of operation of the entire transmission arrangement 1, the hydrostatic transmission 3 will now be described.

As previously mentioned, each of the intermediate shafts 20 and 30 is drivably connected to a hydrostatic unit 22, 32, respectively, of the hydrostatic transmission 3 via a curved teeth coupling 21 and 31, respectively. In general, the hydrostatic transmission 3 is used to transfer drive power, in that a hydrostatic unit 22; 32 functioning as a pump is hydraulically connected, respectively, to a hydrostatic unit 32; 22 functioning as a motor. Since the hydrostatic units 22, 32 are both axial piston machines having a sloping axle design (i.e., these comprise a pivot housing 26 and 36, respectively, which can pivot about an axis in order to change the pump capacity and/or intake volume), the hydrostatic transmission 3 makes it possible, by changing the pump capacity and/or intake volume, to steplessly adjust a speed ratio that exists between the hydrostatic units 22, 32 and, therefore, between the intermediate shafts 20, 30 connected thereto. Given that the hydrostatic units 22, 32 have a substantially identical design (i.e., they are the same model), the hydrostatic transmission 3 can be operated in a reversible direction, i.e., the assignment of the hydrostatic units 22, 32 to the pump and the motor, respectively, is reversible. The design of the hydrostatic transmission 3 is explained in greater detail in the following.

Each of the two hydrostatic units 22, 32 is designed, in an initially known manner per se, as an axial piston machine having a sloping axle design and comprises a rotatable piston housing 25, 35, which is provided with cylinder bores, and pistons 24, 34 inserted therein. Each of the pistons 24, 34 is connected to a wheel-shaped drive flange disk 23, 33 via a ball joint. As shown in FIG. 1, an axis of rotation 70 of the piston housing 25, 35 forms a pivot angle α in each case with an axis of rotation (coincident with intermediate shafts 20, 30) of the drive flange disk 23, 33. The pivot angle can be changed by pivoting a pivot housing (reference signs 26, 36, which are first shown in FIG. 2, FIG. 4a, FIG. 4b for clarity) accommodating the piston housing 25, 35 in order to thereby change the pump capacity and/or intake volume of the hydrostatic units 22, 32.

The hydrostatic unit 22 is assigned to the intermediate shaft 20 and is drivably connected thereto via the curved teeth coupling 21. The hydrostatic unit 32 is assigned to the intermediate shaft 30 and is drivably connected thereto via the curved teeth coupling 31. The two hydrostatic units 22, 23 are hydraulically connected to one another via hydraulic lines 7, 8, which are shown here initially in a simplified illustration. In this manner, drive power is transferred to the hydrostatic unit 32; 22 functioning as a motor from the hydrostatic unit 22; 32 functioning as a pump, respectively. With respect to the intermediate shafts 20, 30, this hydraulic coupling functions, via the pump and the motor, as a transmission that establishes a speed coupling between the intermediate shafts 20, 30. Depending on the operating state (assignment of the hydrostatic units 22, 32 to the pump or the motor), either low pressure prevails in the hydraulic line 7 and high pressure prevails in the hydraulic line 8, or low pressure prevails in the hydraulic line 8 and high pressure prevails in the hydraulic line 7. Due to the possibility of changing the pivot angle α at each of the two hydrostatic units 22, 32, it is possible to steplessly adjust a transmission ratio that exists between the intermediate shafts 20, 30.

The hydromechanical transmission arrangement 1 shown in FIG. 1, which comprises the mechanically power-split transmission 2 and the hydrostatic transmission 3 coupled thereto, can be brought into two different operating states, which result in different attainable gear ratio ranges between the input shaft 10 and the output shaft 40. The coupling 39 is used to switch between a first gear ratio range and a second gear ratio range. The coupling selectively drivably connects either the gear z31 (first gear ratio range) or the gear z30 (second gear ratio range) to the shaft 30. The power flow through the transmission arrangement 1 in each of the gear ratio ranges is described briefly in the following.

First Gear Ratio Range ("Cruising Range 1"):
The input shaft 10 drives the planet gears z52 of the assembled planetary gear 50 via the second sun gear z12. The drive power is now divided into two parts ("power split").
A first portion of the drive power is transferred via the planet gears z51, which are also thereby driven, to the ring gear 53 and, from there, via the gear z20 and the intermediate shaft 20, to the hydrostatic unit 22. This now functions as a pump and drives the hydrostatic unit 32, which functions as a motor. The intermediate shaft 30 driven thereby is drivably connected to the gear carrier 54 via the gear z31, which is connected to the intermediate shaft 30 in a rotationally fixed manner in this case.
A second portion of the drive power is transferred to the gear carrier 54 via the planet axes 51 of the planet gears z52.
The drive power of the first and the second portion are recombined ("power joint") at the gear carrier 54, in order to proceed from the transmission arrangement 1 via the hollow shaft 12, the gear z13, the gear z40 and the output shaft 40. Depending on the selected pivot angles α of the hydrostatic units 22, 32, the output speed of the shaft 40 can be steplessly changed from zero up to a transition speed within the first gear ratio range (given an input speed of the input shaft 10 that is assumed to be constant).

Second Gear Ratio Range ("Cruising Range 2"):
The input shaft 10 drives the planet gears z52 of the assembled planetary gear 50 once more via the second sun gear z12. This time, however, the coupling 39 is engaged such that, rather than the gear z31, it is the gear z30 that is connected to the shaft 30 in a rotationally fixed manner.
Due to the changed shifting state, a portion of the drive power is now transferred via the planet gears z51, which are also thereby driven, to the first sun gear z11, from which the drive power is transferred to the intermediate shaft 30, which is connected to the gear z30 in a rotationally fixed manner in this case, via the hollow shaft 11, the gear z10, and the gear z30 enmeshed therewith. The intermediate shaft 30 now drives the hydrostatic unit 32, which, having reversed its function, now functions as a pump, in order to drive the hydrostatic unit 22, which functions as a motor and which has also reversed its function. The intermediate shaft 20, which is driven by the hydrostatic unit 22, drives the ring gear 53 via the gear z20 and the gear rim z53 enmeshed therewith, the ring gear being enmeshed, in turn, with the planet gears z51 on the inner side.
Depending on the selected pivot angles α of the hydrostatic units 32, 22, the output speed of the shaft 40 can be steplessly changed from the transition speed up to a maximum speed within the second gear ratio range (given an input speed of the input shaft 10 that is assumed to be constant).

By the hydromechanical transmission arrangement 1 shown, it is therefore possible to steplessly change an output speed of the shaft 40 from zero up to the maximum speed within the scope of two gear ratio ranges, which are selected by actuating the coupling 39. When there is a change between the gear ratio ranges, the power flow within the hydrostatic transmission 3 reverses. The reversal of the power flow includes a switch in the functional assignment of the hydrostatic units 22, 32 between pump and motor as well as a reversal of the direction of flow of the hydraulic medium.

Figure 2:
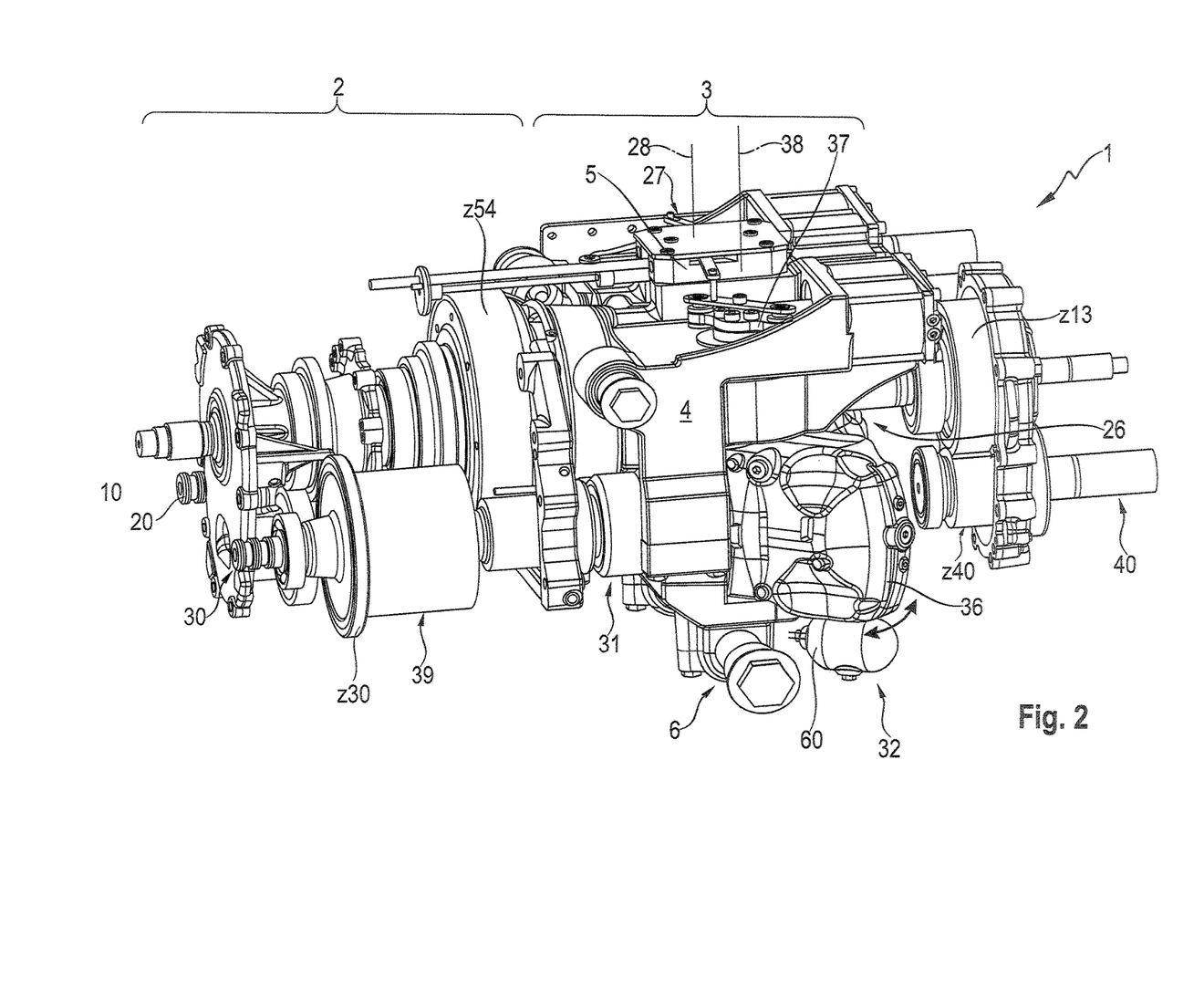
FIG. 2 depicts a perspective view of a transmission arrangement according to an embodiment of the invention.

FIG. 2 shows a perspective view of a preferred structural embodiment of a transmission arrangement 1 explained with reference to FIG. 1. In FIG. 2, machine elements that have the same reference signs have the same mode of operation as the machine elements explained with reference to FIG. 1 and are therefore not explained again.

Additionally, it is clear from FIG. 2, in particular, that the hydrostatic transmission 3 comprises a bearing bridge 4. The bearing bridge 4 comprises fasteners 6 for mounting the hydrostatic transmission. The bearing bridge 4 preferably is produced from a cast part, which is shown in a perspective isolated depiction in FIG. 3. Therein, it is clear that the bearing bridge 4 comprises two receptacles, which are spaced apart from one another by a distance d, for one hydrostatic unit 22, 32 in each case. Therefore, the bearing bridge 4 accommodates the two hydrostatic units in an axially parallel orientation, separated by a distance d, wherein the illustration in FIG. 2 shows, in particular, the hydrostatic unit 32, including the pivot housing 36 thereof and a Helmholtz resonator 60 formed thereon, the pivot housing being drivably connected to the shaft 30. However, the hydrostatic unit 22, which is drivably connected to the shaft 20, is substantially covered by the bearing bridge 4 (only one part of the pivot housing 26 thereof is visible).

As indicated in FIG. 2, the pivot housing 36 of the hydrostatic unit 32, which accommodates the piston housing 35 of the hydrostatic unit 32 so as to be rotatable about an axis of rotation 70, can pivot about an adjustment axis 38. According to the schematic illustration in FIG. 1, the pivot angle α and, therefore, the intake volume and/or pump capacity of the hydrostatic unit 32 can be changed in this manner. Likewise, a pivot housing 26 of the hydrostatic unit 22 (which is not shown in entirety here) can pivot about an adjustment axis 28, in order to change the pivot angle α and, therefore, the intake volume and/or pump capacity of the hydrostatic unit 22. In the case of the hydrostatic unit 32, the pivot angle α is changed via a pivot strap 37, which can be hydraulically actuated by an adjustment piston, which is not described here in greater detail, or, in the case of the hydrostatic unit 22, via a hydraulically actuatable pivot strap 27. A sensor arrangement 5, which is mechanically coupled to the pivot straps 37 and 27, respectively, detects the pivot angle α of the hydrostatic unit 22 and 32, respectively.

In practical application, it is shown that transmission arrangements that comprise a hydrostatic transmission generate noise at least in certain operating situations, in particular at certain speeds, which can be perceived as being disturbing. In order to prevent such a development of noise, in the case of the transmission arrangement 1 according to the invention, means for damping hydraulic pressure fluctuations are assigned to the hydraulic lines connecting the hydrostatic units 22, 32. The type and mode of operation of such means is explained in greater detail in the following.

In order to fulfill the desired mode of operation of the hydrostatic transmission 3, the hydrostatic units 22, 32 are connected to one another via hydraulic lines, as schematically illustrated in FIG. 1 with the reference signs 7, 8 therein, to form a hydraulic circuit. These hydraulic lines extend, in regions, through the pivot housing 26, 36 of the two hydrostatic units 22, 32, respectively, and, in regions (in a section located between oil feeders 61 of the hydrostatic units 22, 32), through the bearing bridge 4 and, to this end, are cast into these components. The length of the line section extending through the bearing bridge 4 is primarily determined by the distance d separating the hydrostatic units 22, 32 from one another.

Figure 4A:
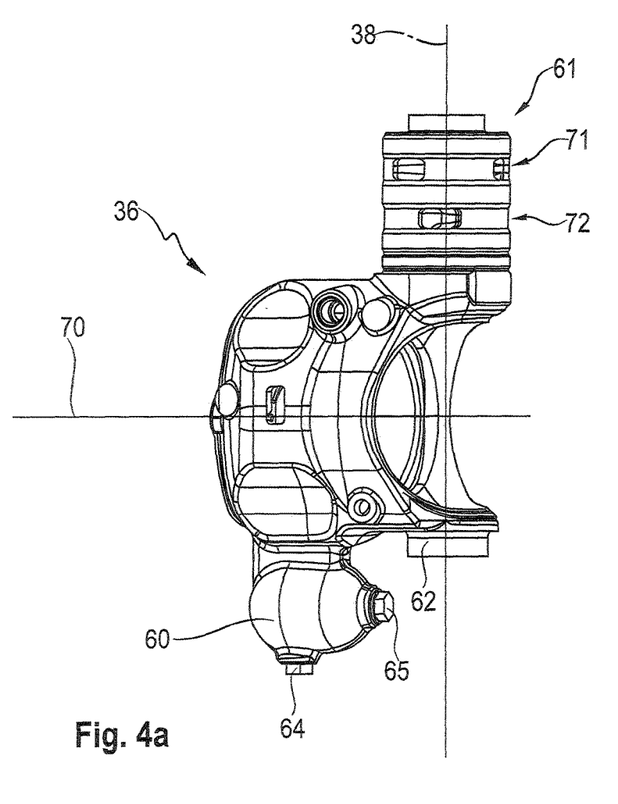
FIG. 4a depicts a perspective view, from the side, of a pivot housing of a hydrostatic transmission.
Figure 4B:
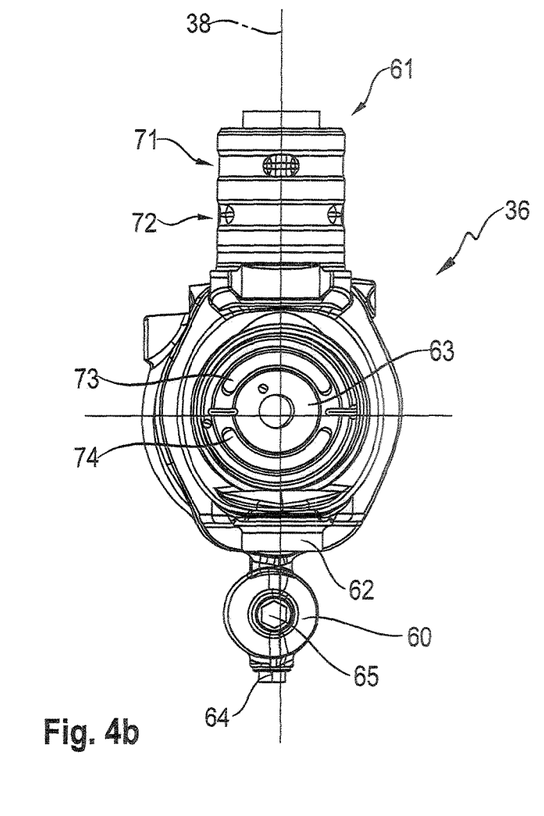

FIGS. 4a and 4b show a perspective view of the pivot housing 36, from the side and from the front, respectively, in an isolated view. It should be noted that a pivot housing, which basically has the same design as the pivot housing 36, is also used on the hydrostatic unit 22. In order to prevent repetitions, the pivot housing 36 is described in the following so as to also represent the pivot housing 26 of the hydrostatic unit 22.

Figure 3:
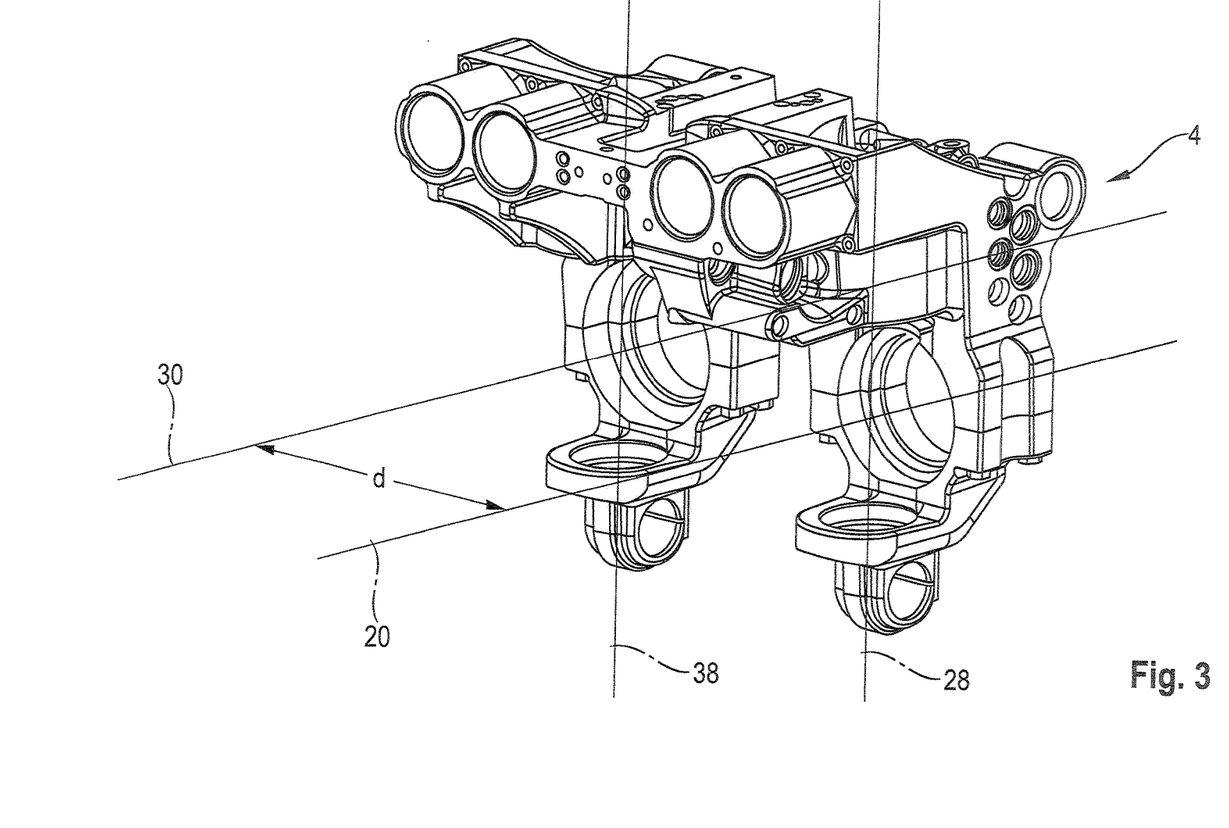
FIG. 3 depicts a bearing bridge of the transmission arrangement shown in FIG. 2.
Figure 5:
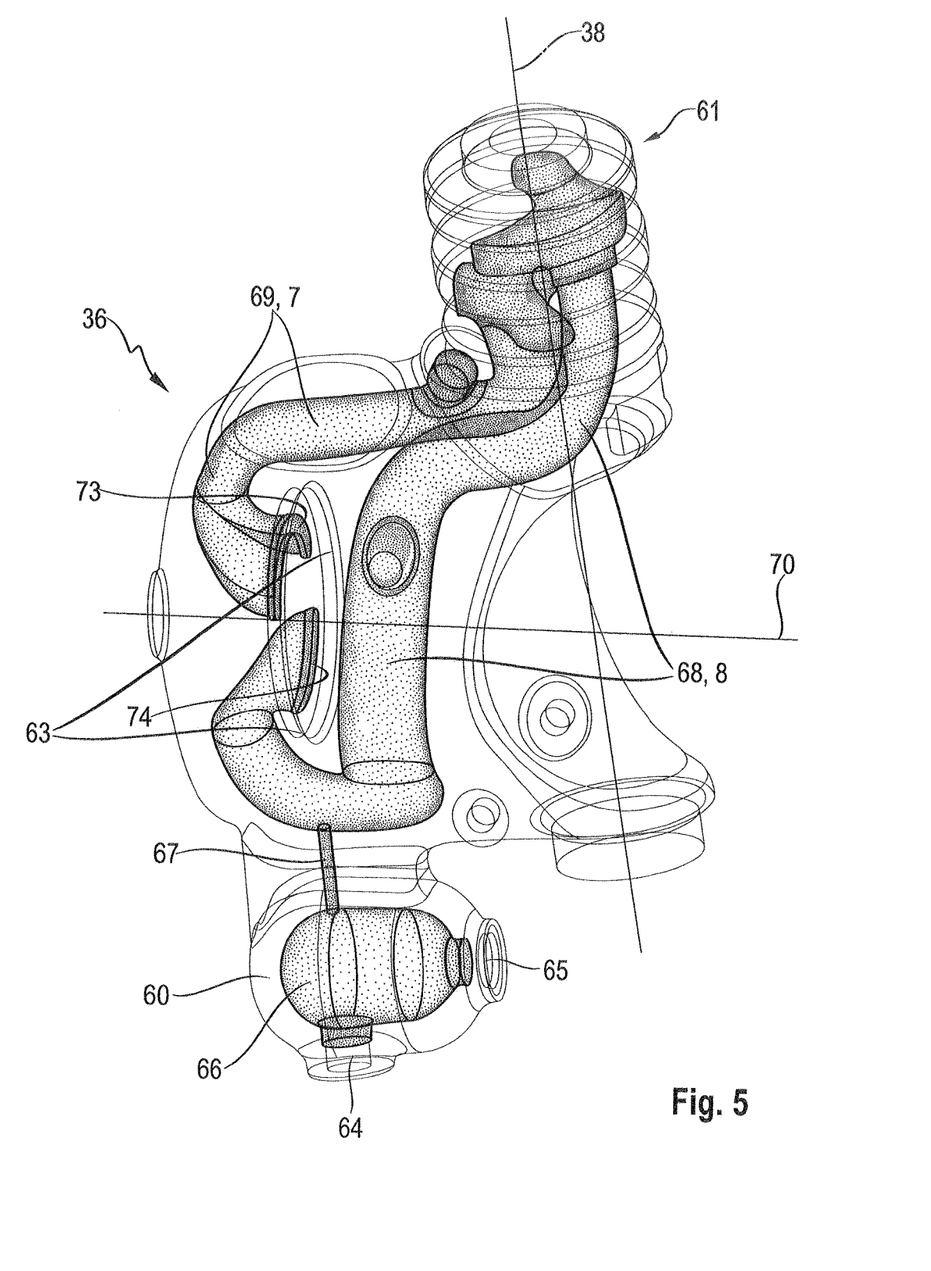
FIG. 5 depicts a perspective view of a pivot housing of the type illustrated in FIGS. 4a and 4b, with the hydraulic lines made visible.

The pivot housing 36 is installed on the bearing bridge 4 shown in FIG. 3, in the region of the adjustment axis 38, wherein the pivot housing pivots about the adjustment axis 38 in order to change the pump capacity and/or intake volume of the hydrostatic unit 32. The pivot housing 36 is produced as a cast part, which has an approximately cylindrical recess in a central region, as shown in FIGS. 4a and 4b, which predefines the axis of rotation 70 of a piston housing 35 (omitted in FIGS. 4a, 4b for clarity), which can be inserted into the recess. As shown in FIG. 4b, the recess is delimited on the inner side by a circular form plate 63. Two kidney-shaped recesses 73, 74, which are arranged opposite one another relative to the axis of rotation 70, are formed at this form plate 63. With reference to FIG. 5, which shows a perspective view of the pivot housing 36, in which the hydraulic lines extending through the pivot housing 36 are visible, it becomes clear that the kidney-shaped recesses 73, 74, which are shown in FIG. 4b, of the form plate 63 are part of the hydraulic supply of the axial piston machine (piston housing 35). This will be explained in greater detail at a later point.

In order to allow the pivot housing 36 to pivot as required, an oil feeder 61 having a basic cylindrical shape as well as a cylindrical hinge pin 62, which predefine the adjustment axis 38 of the pivot housing 36, are formed on the pivot housing 36. Given that the pivot housing 36 is mounted by the hinge pin 62 and the oil feeder 61 relative to the bearing bridge 4 illustrated in FIG. 3, the pivot housing 36 can pivot about the adjustment axis 38 relative to the bearing bridge 4.

The hinge pin 62 is a purely mechanically functioning element (pivot spindle). In contrast, the oil feeder 61 not only has the mechanical function of a pivot spindle, but also the function of ensuring the hydraulic supply at the transition between the bearing bridge 4 and the pivot housing 36, which is movable relative to the bearing bridge. To this end, the oil feeder 61 has two peripheral regions 71, 72, which are axially spaced apart from one another. Openings in the form of slots extending in the circumferential direction are formed on each of these circumferential regions 71, 72. Two annular recesses are formed in the bearing bridge 4, in a region accommodating the oil feeders 61 of the pivot housing 36, so as to be correspondingly axially spaced apart from one another, such that, in cooperation, two hydraulic connections are formed between the pivot housing 36 and the bearing bridge 4, one of which is part of the hydraulic line 7 and the other of which is part of the hydraulic line 8 (cf. FIG. 1).

In order to further explain the line routing within the pivot housing 36, reference is now made to FIG. 5, which shows a perspective view of the pivot housing 36, in which the hydraulic lines are visible, the hydraulic lines extending through the pivot housing 36 and being cast therein. The slots of the upper circumferential region 71 of the oil feeder 61 are therefore assigned to along supply line 68. This long supply line 68 establishes a hydraulic connection between the oil feeder 61 and the lower kidney-shaped recess 74 of the form plate 63. With reference to the schematic illustration of FIG. 1, the long supply line 68 is therefore part of the hydraulic line 8, which connects the hydrostatic unit 22 to the hydrostatic unit 32. To this end, in contrast, slots of the lower circumferential region 72 of the oil feeder 61 are assigned to a short supply line 69. This short supply line 69 establishes a hydraulic connection between the oil feeder 61 and the upper kidney-shaped recess 73 of the form plate 63. With reference to the schematic illustration of FIG. 1, the short supply line 69 is therefore part of the hydraulic line 7, which connects the hydrostatic unit 22 to the hydrostatic unit 32.

In an axially parallel arrangement of hydrostatic units 22, 32 having a sloping axle design, as is present here, due to the dimensions of the units 22, 32 and the pivotability of the associated pivot housing, a certain distance d between the hydrostatic units 22, 32 sets in, in practical application. This distance d is basically of a similar size for applications on agricultural tractors, for example. The length of the hydraulic lines 7, 8, which extend from one hydrostatic unit 22 to the other hydrostatic unit 32, is substantially determined by this distance d of the hydrostatic units 22, 32 relative to one another, as are the size and structural design of the pivot housing 26, 36.

In order to prevent operating noises, which can result during operation of the hydrostatic transmission 3 of the described transmission assembly 1, at least in certain operating situations, means for damping hydraulic pressure fluctuations are assigned to the two hydraulic lines 7, 8 connecting the hydrostatic units 22, 32.

Reference is initially made to FIG. 5 with respect to a preferred configuration of these means. According thereto, the long supply line 68, which is part of the hydraulic line 8 in the case of the pivot housing 36 (or is part of the hydraulic line 7 in the case of the structurally identical pivot housing 26), is connected to a hydraulically functioning damping element, which is designed as a so-called Helmholtz resonator 60. This Helmholtz resonator 60 is an integral component of the pivot housing 36, namely being cast therewith as one piece. The Helmholtz resonator 60 substantially comprises a hydraulic volume 66, which is enclosed by a hollow body region of the pivot housing 36 formed underneath the long supply line 68. A lower access opening 64 and a lateral access opening 65, each of which is closed, in the installed state, by (non-illustrated) screw plugs, ensure access that simplifies the production of the Helmholtz resonator 60. The hydraulic volume 66 has an assembled shape that is cylindrical in regions and is hemispherical in regions. Equally conceivable is a spherical or cylindrical shape and/or an ovoid shape, since hydraulic volumes having this shape, as a mass-spring system, also have a pronounced natural frequency. In addition to the aforementioned shapes, modifications of these shapes or other shapes are also possible for achieving oscillation damping.

Relative to the entire length of the hydraulic line 8, the hydraulic volume 66 is relatively close to an end (which is formed by the lower kidney-shaped recess 74, which is formed on the form plate 63 and establishes the transition to the piston housing 35 of the hydrostatic unit 32) of the hydraulic line 8 facing the hydrostatic unit 32 and is operatively connected thereto within the pivot housing 36 via branch channel 67.

The hydraulic volume 66 coupled to the hydraulic line 8 via the branch channel 67 is used for damping hydraulic pressure fluctuations that propagate within the hydraulic line 8 during operation of the hydrostatic transmission 3. The Helmholtz resonator 60 is an acoustic resonator, in the case of which the hydraulic volume 66, including the branch channel 67, which is considered to be springy under certain operating conditions (in particular certain operating speeds of the axial piston machines), is an acoustic system, which is capable of oscillating and has a certain resonant frequency, or several resonant frequencies. The thusly formed Helmholtz resonator is designed and arranged such that the Helmholtz resonator is suitable for absorbing hydraulic oscillations that occur during operation of the hydrostatic transmission 3, in accordance with this resonant frequency. Specifically, it has been shown that, in the case of transmission arrangements comprising a hydrostatic transmission 3 of the stated type or a comparable type, the axial piston machines induce hydraulic pressure fluctuations, due to the principle thereof. These are pressure pulsations, i.e., pressure fluctuations, which occur due to the periodic piston strokes and the thereby induced periodic compression and expansion of the hydraulic fluid (typically hydraulic oil) in the moment of the connection with the respective high-pressure or low-pressure side, and which propagate in the form of pressure waves within the hydraulic oil located in the hydraulic lines.

Transmission arrangements having a hydrostatic transmission are usually operated with a variable speed, since this is usually the purpose of a hydrostatic transmission. The speeds of the hydrostatic units therefore steplessly pass through wide ranges. The hydraulic pressure waves that result due to operation therefore have variable frequencies (f) and, therefore, wavelengths ($\lambda$). According to the general relationship, according to which the wavelength ($\lambda$) corresponds to the quotient of the velocity of propagation (in oil as the medium in this case) divided by frequency (f), there is an inversely proportional relationship between frequency (f) and wavelength ($\lambda$), i.e., as the frequency (f) increases, the wavelength ($\lambda$) decreases, and vice versa. In short, the pressure pulsations generated in the hydrostatic units form hydraulic pressure waves, the wavelength of which is dependent on the frequency at which the pistons of the hydrostatic unit induce the pulsation. Thus, there is a direct correlation between the rotational speed of a hydrostatic unit and the wavelength of the hydraulic pressure fluctuations that are generated.

The following observations can be made about a transmission arrangement 1 of the above-described type. If half the wavelength $\lambda/2$, or a multiple thereof, of the hydraulic pressure fluctuations generated by one of the hydrostatic units 22, 32 corresponds to the structural length of a hydraulic line between this hydrostatic unit 22; 32 and the other hydrostatic unit 32; 22 connected thereto, a stationary pressure wave ("standing wave") forms within the pertinent hydraulic line, in which the pressure amplitude continuously increases. On the high-pressure side of a hydraulic circuit (specifically the hydraulic line that conveys from the pump to the motor), such an amplification causes a continuously increasing pulse to be transferred from the hydraulic line to the mechanical structure of the line, i.e., for example, the pivot housing 36 and the bearing bridge 4, which causes vibrations and, therefore, noise. In addition, on the low-pressure side of the hydraulic circuit (specifically the hydraulic line that conveys from the motor back to the pump) there is a risk that the dynamic pressure will drop by a great extent. In this case, it is even possible for cavitation (i.e., a formation of vapor caused by the pressure drop) to occur within the hydraulic medium, which also causes noise.

In order to avoid these interfering effects, the Helmholtz resonator provided on the transmission arrangement 1 is designed such that the Helmholtz resonator damps precisely such hydraulic fluctuations, the half wavelength $\lambda/2$ of which, or a multiple thereof, corresponds to the length of the hydraulic line 7, 8 between the two hydrostatic units 22, 32.

The maxima of the stationary wave occur, for physical reasons, at the end of a hydraulic line in each case, i.e., specifically at the transition of the line 7 to the axial piston machine 32, for example, i.e., in the region of the kidney-shaped recess 74 formed on the form plate 63 of the pivot housing 36. For effective damping, the coupling of the Helmholtz resonator 60 to the hydraulic line 8 is therefore preferably located as close as possible to the kidney-shaped recess 74. In the exemplary embodiments shown in FIG. 5, the coupling takes place via the branch channel 67, which leads into the hydraulic line 8 at one end thereof (close to the form plate 63). If the placement were not close, the efficacy of the hydraulically effective damping element 60 would either not be ensured or only to a limited extent.

As an alternative to a Helmholtz resonator of the type shown, other hydraulically effective damping elements could also be used, such as a lambda/4 hose or hydraulic spring-operating storage, for example.

In the case of a preferable Helmholtz resonator 60 as described above, the resonant frequency is determined from various variables such as the velocity of propagation (sound velocity) within the hydraulic oil, the resonator volume, the cross section of the bore, and the length of the bore of the branch channel 67, which functions as the resonator neck. The length of the branch channel 67, inter alia, from the point in the hydraulic line 8 to be damped to the hydraulic volume 66 is therefore very significant. The embodiment of the Helmholtz resonator 60 shown in FIG. 5 offers the advantage that the hydraulic line is connected to the Helmholtz resonator 60 within the cast body of the pivot housing 36. At the same time, by placing the Helmholtz resonator 60 underneath the long supply line 68, it is ensured that the existing installation depth of the pivot housing 36 relative to the adjustment axis 38 does not increase. The pivotability is therefore not adversely affected.

The Helmholtz resonator 60 shown in FIG. 5 initially has certain damping characteristics. However, there are basically various possibilities for influencing these damping characteristics. For example, the resonant frequency can be designed to be adjustable. To this end, it is possible, for example, for the size of the hydraulic volume 66 to be variable, in that, for example, a screw plug that closes the access openings 64 and 65 is screwed in to different depths in order to thereby change the size of the hydraulic volume 66. In addition, the hollow body enclosing the hydraulic volume 66 could be designed to have multiple components and to be telescopic in the region of the cylindrical section. In addition to the resonant frequency, the damping could be designed to be adjustable. To this end, an orifice plate, i.e., a constriction, could be provided, for example, in the region of the branch channel 67 functioning as the resonator neck, in order to increase the bandwidth of resonance phenomena. An orifice plate can be created by means of various measures, for example, by means of a stepped bore that is designed such that the branch channel 67 has a constriction at the end thereof facing the long supply line 68. As an alternative, an orifice plate screwed into the branch channel 67 could be provided at the inlet of the branch channel 67 facing the hydraulic volume 66. Further embodiments are conceivable depending on the design of the hydrostatic unit that is used.

Finally, it should be noted that the structural embodiment of the transmission arrangement shown with reference to the exemplary embodiment should be considered to be merely an example. The invention also can be used on other transmission arrangements, in particular also on transmission arrangements that exclusively comprise a hydrostatic transmission or on transmission arrangements that comprise a mechanically power-split transmission having a different design.

LIST OF REFERENCE SIGNS 1 hydromechanical transmission
2 power-split transmission
3 hydrostatic transmission
4 bearing bridge
5 sensor
6 fastening
7 hydraulic line
8 hydraulic line
10 input shaft
11 hollow shaft
12 hollow shaft
13 power take-off shaft
z10 gear
z11 first sun gear
z12 second sun gear
z13 gear
20 intermediate shaft
21 curved teeth coupling
22 hydrostatic unit
22 drive flange
23 piston
24 piston housing
25 pivot strap
28 adjustment axis
z20 gear
30 intermediate shaft
31 curved teeth coupling
32 hydrostatic unit
33 drive flange
34 piston
35 piston housing
36 pivot housing
37 pivot strap
38 adjustment axis
39 coupling
z30 gear
z31 gear
40 output shaft
z40 gear
50 assembled planetary gear
51 planet axis
53 ring gear
54 gear carrier
z51 planet gear (first stage)
z52 planet gear (second stage)
z53 gear rim
z54 gear rim
60 Helmholtz resonator
61 oil feeder
62 hinge pin
63 form plate
64 lower access opening
65 lateral access opening
66 hydraulic volume
67 branch channel
68 long supply line
69 short supply line
70 axis of rotation of piston housing
71 upper circumferential region
72 lower circumferential region
73 upper kidney-shaped recess
74 lower kidney-shaped recess
$\alpha$ pivot angle
d distance As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A transmission arrangement, comprising:
   at least one hydrostatic transmission in which a hydrostatic unit functioning as a pump is hydraulically connected to a hydrostatic unit functioning as a motor in order to transfer drive power; and
   a hydraulically effective damping element for damping hydraulic pressure fluctuations assigned to a hydraulic line connecting the at least one hydrostatic unit,
   wherein the hydraulically effective damping element is selected from a group consisting of: a Helmholtz resonator, a lambda/4 hose, hydraulic spring-operating storage and an active damping element, and
   wherein the hydraulically effective damping element is designed to damp oscillations, a half wavelength of which, or a multiple thereof, corresponds to a length of the hydraulic line between the two hydrostatic units, and
   wherein the hydraulically effective damping element is an integral component of the pivot housing, and the pivot housing comprising the integrated damping element is a cast part.

2. The transmission arrangement according to claim 1, wherein at least one of the hydrostatic units is designed as an axial piston machine having a variable pump capacity, a variable intake volume or both.

3. The transmission arrangement according to claim 2, wherein at least one of the hydrostatic units has a sloping axle design and comprises a pivot housing that pivots about an axis in order to vary the pump capacity, the intake volume or both of the at least one hydrostatic unit.

4. The transmission arrangement according to claim 3, wherein the axial piston machine comprises a rotatable piston housing provided with cylinder bores and having pistons inserted therein, which are connected to a wheel-shaped drive flange disk, wherein an axis of rotation of the piston housing forms, in each case, a pivot angle ($\alpha$) with an axis of rotation of the drive flange plate, and wherein the pivot angle (α) is changed by pivoting a pivot housing, which accommodates the piston housing, about a pivot axis, in order to change the pump capacity, the intake volume of the hydrostatic unit or both.

5. The transmission arrangement according to claim 3, wherein a hydraulic line extends, in sections, through the pivot housing of one of the hydrostatic units and the hydraulically effective damping element is connected to the hydraulic line within the pivot housing.

6. The transmission arrangement according to claim 5, wherein the hydraulically effective damping element is connected to the hydraulic line at or at least close to an end of the hydraulic line facing the one hydrostatic unit.

7. The transmission arrangement according to claim 1, wherein the hydraulically effective damping element is formed by a hydraulic volume, which is connected to the hydraulic line and is enclosed by a hollow body.

8. The transmission arrangement according to claim 1, wherein the hydrostatic units are connected to one another via parallel hydraulic lines to form a hydraulic circuit having a high-pressure side and a low-pressure side, wherein the hydrostatic units are designed such that the hydrostatic transmission can be operated with a reversible direction of hydraulic flow, for the purpose of which an assignment of the two hydrostatic units can be switched between pump and motor.

9. The transmission arrangement according to claim 1, wherein a separate pivot housing is assigned to the hydrostatic units, such that a pump capacity, an intake volume or both of each of the two hydrostatic units can be adjusted individually.

10. The transmission arrangement according to claim 1, wherein the hydrostatic units are assigned to a common pivot housing such that a pump capacity, an intake volume or both of the hydrostatic units can be adjusted jointly.

11. The transmission arrangement according to claim 1, wherein the hydrostatic transmission has a bearing bridge, which accommodates the hydrostatic units in an axially parallel orientation and with distance (d) therebetween.

12. The transmission arrangement according to claim 3, wherein the hydraulic line is designed, at least in regions, as a line cast into the bearing bridge of the hydrostatic transmission.

13. The transmission arrangement according to claim 1, wherein the transmission arrangement further comprises a power-split mechanical transmission, which interacts with the hydrostatic transmission in order to form a hydromechanical transmission arrangement.

14. The transmission arrangement according to claim 13, wherein each of the hydrostatic units is drivably connected to a shaft of the power-split mechanical transmission via a coupling element.

15. The transmission arrangement according to claim 13, wherein the hydromechanical transmission arrangement is brought from a first gear ratio range into a second gear ratio range, and wherein a power flow of the hydrostatic transmission reverses in the event of a switch between the gear ratio ranges.

* * * * *